United States Patent [19]

Otrusina

[11] Patent Number: 4,605,335
[45] Date of Patent: Aug. 12, 1986

[54] QUICK-RELEASE CONNECTOR WITH TEARDROP-SHAPED CONFIGURATION

[76] Inventor: Edward C. Otrusina, 19 W. 240 Oldfield Rd., Downers Grove, Ill. 60515

[21] Appl. No.: 706,673

[22] Filed: Feb. 28, 1985

[51] Int. Cl.⁴ .......................... F16D 1/06; A45F 5/00
[52] U.S. Cl. .................................. 403/348; 403/353; 24/3 L; 24/10 A; 224/269
[58] Field of Search .............. 403/353, 348, 349, 381; 24/3 L, 3 M, 3 H, 3 R, 10 A; 224/269, 252, 253

[56] References Cited

U.S. PATENT DOCUMENTS

| | | |
|---|---|---|
| 2,172,924 | 9/1939 | Gwinn, Jr. et al. |
| 2,543,313 | 2/1951 | Dietzgen . |
| 2,658,650 | 11/1953 | Jasper . |
| 3,080,634 | 3/1963 | Lindblad . |
| 3,117,708 | 1/1964 | Goldman . |
| 3,261,519 | 7/1966 | Horne . |
| 3,310,271 | 3/1967 | King . |
| 3,365,756 | 1/1968 | Bayon . |
| 3,734,548 | 5/1973 | Kieves ............................ 403/353 |
| 3,743,147 | 7/1973 | Wilczynski . |
| 3,797,717 | 3/1974 | Collins . |
| 3,878,589 | 4/1975 | Schaefer . |
| 3,934,768 | 1/1976 | Jones . |
| 3,986,780 | 10/1976 | Nivet .............................. 403/353 |
| 4,182,470 | 1/1980 | Atkinson . |
| 4,310,111 | 1/1982 | Brent . |
| 4,362,414 | 12/1982 | Volz . |
| 4,458,383 | 7/1984 | Hwang . |

Primary Examiner—Cornelius J. Husar
Assistant Examiner—Peter M. Cuomo
Attorney, Agent, or Firm—Emrich & Dithmar

[57] ABSTRACT

Quick-release connecting apparatus for mounting an object on a belt includes male and female members, respectively attachable to the object and the belt. The male member has a stud projecting therefrom with a teardrop-shaped button or flange at its distal end which has the same configuration as a teardrop-shaped opening in the front surface of the female member, which opening communicates with a circular recess in the rear of the female member and larger than the opening. The button is insertable axially through the opening and into the recess, permitting rotation of the male member about 180° to an attached position wherein the button engages the bearing surface at three spaced-apart locations. The stud has arcuate surfaces which can engage the edges of the opening when the male member is disposed in the recess for inhibiting translational movement of the male member except during insertion into and withdrawal from the opening.

17 Claims, 6 Drawing Figures

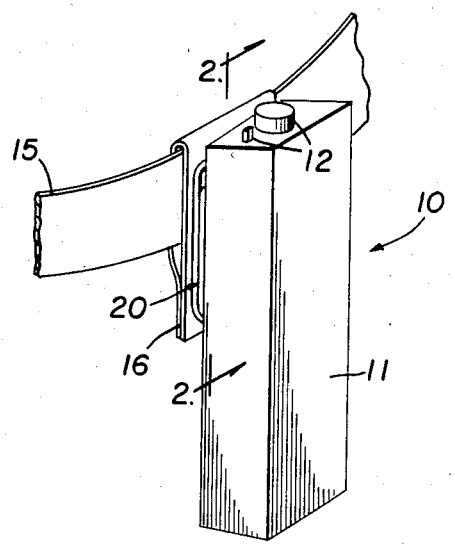
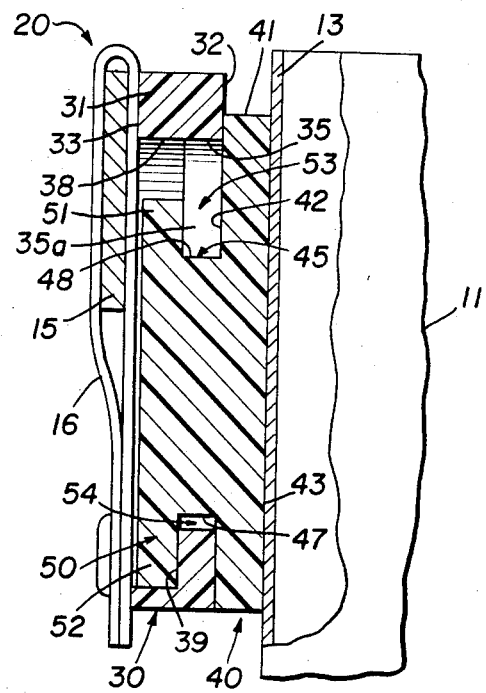
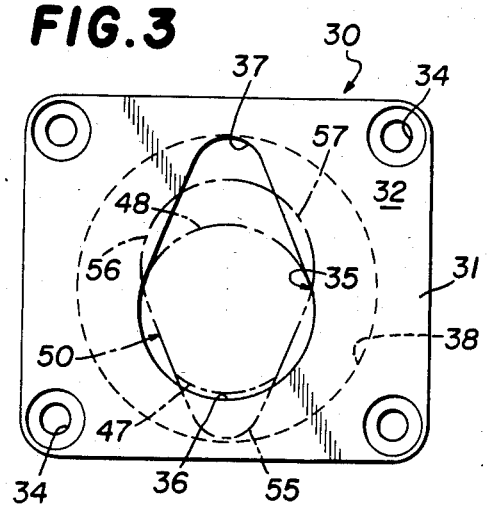
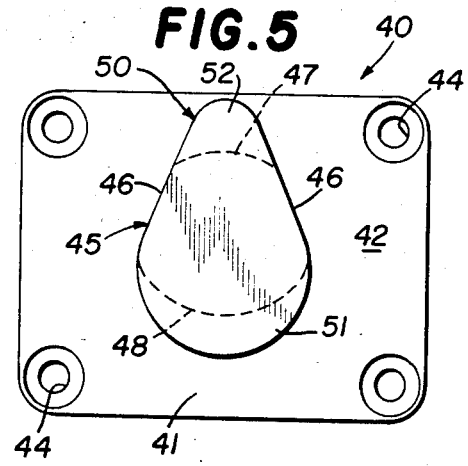
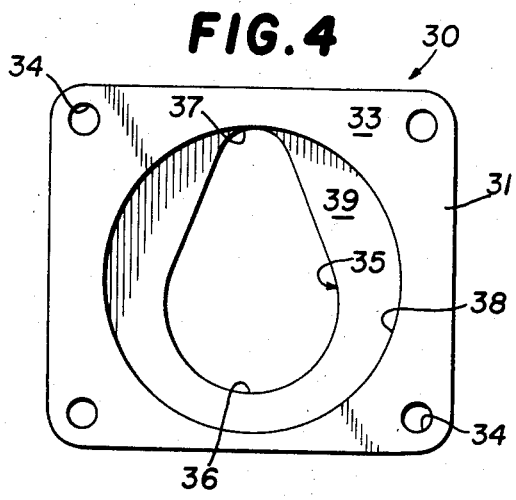
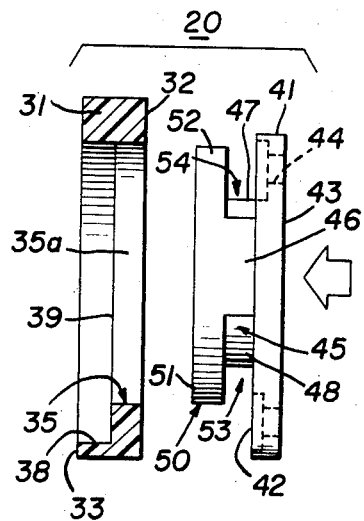

QUICK-RELEASE CONNECTOR WITH TEARDROP-SHAPED CONFIGURATION

BACKGROUND OF THE INVENTION

The present invention relates to connecting or fastening devices, and particularly to a connecting apparatus that permits an object, such as a radio paging receiver or the like, to be removably fastened to a belt.

A number of such connecting apparatuses have been provided heretofore. Fundamentally, these connecting apparatuses include male and female members engageable with each other. In some such devices a tilting of the male member is necessary in order to effect insertion into the female member to effect the type of interconnection which is commonly used on pegboards. In other such devices, a retaining clip or member is used to lock the male and female members together. Other types of devices are characterized by two types of movement of the male member during attachment to the female member, viz., an inserting movement followed by a rotational movement to bring the parts to a position which prevents detachment. The two movements are reversed for disconnection of the parts. The present invention relates fundamentally to this last type of connecting apparatus.

One such type of connecting apparatus is disclosed in U.S. Pat. No. 3,878,589. However that device requires the use of a bias spring member to retain the parts in their attached condition. Another such device is disclosed in U.S. Pat. No. 3,743,147 which utilizes a generally D-shaped male member insertable into a generally D-shaped opening in the female member. This configuration results in an arrangement wherein, when the male member is rotated to its attached position, the main area of engagement with the female member is at the bottom of the opening therein, the only other points of engagement being at two very small spaced-apart regions adjacent to the top of the opening. Since the natural tendency of the attached object, in this case a radio receiver, is to tilt so that the upper part of the button is pulled out of the hole, these very small upper bearing regions wear out rather rapidly, significantly shortening useful life of the device.

Furthermore, the female members of the devices of both of these patents are of relatively expensive multi-part construction, involving the use of two parallel plates secured together for cooperation to define a recess for receiving the male member. cl SUMMARY OF THE INVENTION It is a general object of the present invention to provide a quick-release connecting apparatus which avoids the disadvantages of prior devices, while affording additional structural and operating advantages.

An important object of the invention is the provision of a quick-release connecting apparatus which is of relatively simple and economical construction.

It is another object of the invention to provide a connecting apparatus of the type set forth which provides a secure attachment while affording improved wear resistance of the engaged portions of the apparatus.

Still another object of the invention is the provision of a connecting apparatus of the type set forth, which provides a relatively tight interconnection wherein the parts are substantially inhibited from non-rotational movement.

These and other objects of the invention are attained by providing quick-release connecting apparatus for detachably interconnecting two objects, such as a belt and a device to be carried on the belt, including in combination: a female member adapted to be secured to one of the objects and having a front surface, the female member having a generally teardrop-shaped opening in the front surface thereof and a recess formed behind said opening, the recess being larger than the opening and communicating with the entire area of the opening and defining a bearing surface along the periphery of the opening, a male member adapted to be secured to the other object and having a stud extending therefrom and a button at the distal end of the stud, the button having the same configuration as the opening and being sized to pass therethrough but having a cross-sectional area substantially greater than that of the stud so that the button forms a flange extending laterally from the stud, the male member being rotatable about the axis of the stud between first and second positions when the stud is disposed in the opening with the button disposed in the recess, the button being aligned with the opening when the male member is in the first position thereof for permitting insertion of the button into and withdrawal of the button from the opening, the button being out of alignment with the opening and engageable with the bearing surface when the male member is in the second position thereof for preventing detachment of the male body from the female body.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary perspective view of a radio receiver mounted on a belt by the use of the connecting apparatus of the present invention;

FIG. 2 is an enlarged, fragmentary view in vertical section taken along the line 2—2 in FIG. 1;

FIG. 3 is a front elevational view of the female member of the connecting apparatus of FIG. 2 with the male member in its attached position illustrated in phantom;

FIG. 4 is a rear elevational view of the female member of FIG. 3;

FIG. 5 is a front elevational view of the male member of the connecting apparatus of FIG. 2 rotated 180° from the normal use position of FIG. 2; and FIG. 6 is a reduced exploded view of the connecting apparatus illustrated in FIG. 2, with the female member shown in section and the male member shown in side elevation.

DESCRIPTION OF THE PREFERRED EMBODIMENT

Referring to FIGS. 1 and 2, there is illustrated a radio paging receiver 10 which is mounted on a belt 15 by means of a connecting apparatus 20 constructed in accordance with and embodying the features of the present invention. The radio paging receiver 10 includes a box-like case 11 which carries control buttons 12 on the top thereof and has a flat rectangular rear wall 13. While, for purposes of illustration, a radio paging receiver is shown, it will be appreciated that the case 11 could house any other type of device. The belt 15 carries a hanger loop 16, which may be formed of any suitable material, for hanging the radio paging receiver 10 on the belt 15.

Referring now also to FIGS. 3-6, the connecting apparatus 20 includes a female member 30 adapted to be mounted on the hanger loop 16 and a male member 40 adapted to be fastened to the rear wall 13 of the case 11. In a constructional model of the present invention, each of the female and male members 30 and 40 is of unitary one-piece construction, preferably being molded of plastic.

The female member 30 includes a flat, rectangular base plate 31 having flat planar front and rear surfaces 32 and 33 disposed substantially parallel to each other. Four holes 34 extend through the base plate 31 from the front surface 32 to the rear surface 33, respectively adjacent to the four corners of the base plate 31, for respectively receiving associated fasteners (not shown), securely to fasten the base plate 31 to the hanger loop 16, with the rear surface 33 of the base plate 31 disposed against the hanger loop 16.

Formed in the front surface 32 of the base plate 31 is a generally teardrop-shaped opening 35 which includes a part-circular lower portion 36 and a substantially triangular upper lobe portion 37, generally in the shape of an isosceles triangle. The opening 35 has a cylindrical peripheral surface 35a. The portions 36 and 37 are arranged so that the radial bisector of the arcuate part-circular portion 36 and the bisector of the angle between the equal-length sides of the triangular portion 37 are collinear. Formed in the rear surface 33 of the base plate 31 is a circular recess 38 which is substantially larger than the opening 35 and communicates therewith across the entire cross-sectional area thereof, the apex of the triangular upper portion 37 of the opening 35 being disposed substantially tangent to the circular recess 38. The inner end of the recess 38 defines a flat planar bearing surface 39 disposed substantially parallel to the front and rear surfaces 32 and 33 and approximately midway therebetween.

The male member 40 also includes a flat rectangular base plate 41 having parallel front and rear surfaces 42 and 43 and including four holes 44 extending through the base plate 41 respectively adjacent to the four corners thereof. The holes 44 receive associated fasteners (not shown), securely to fasten the base plate 41 to the rear wall 13 of the case 11. Integral with the base plate 41 and projecting forwardly from the front surface 42 thereof substantially perpendicular thereto and generally centrally thereof is a stud 45. The stud 45 has two opposed, inclined flat sides 46 converging at an included angle substantially equal to the apex angle of the triangular portion 37 of the opening 35 in the female member 30. The stud 45 also has opposed arcuate surfaces 47 and 48 which respectively interconnect the side surfaces 46 at the opposite ends thereof.

Integral with the stud 45 at its distal end is an enlarged, teardrop-shaped button 50 which has substantially the same configuration as the opening 35 in the female member 30, including a part-circular portion 51 and a portion 52 substantially in the shape of an isosceles triangle. The button 50 is substantially flat and parallel to the base plate 41, and has a front-to-back thickness slightly less than the depth of the recess 38 in the female member 30. The part-circular portion 51 of the button 50 projects well beyond the arcuate surface 48 of the stud 45 and cooperates with the front surface 42 to define therebetween an arcuate slot or channel 53. Similarly, the triangular portion 52 of the button 50 extends well beyond the arcuate surface 47 of the stud 45 and cooperates with the front surface 42 to define therebetween an arcuate slot or channel 54. The thickness of the channels 53 and 54, i.e., the distance between the front surface 42 and the button 50, is slightly greater than the depth of the cylindrical peripheral wall 35a of the opening 35 in the female member 30, i.e., the distance between the front surface 32 and the bearing surface 39.

The male member 40 is shown inverted in FIG. 5. In use, it will typically be mounted adjacent to the upper end of the case 11, with the triangular portion 52 of the button 50 pointing downwardly, as indicated in FIG. 2. In order to mount the radio paging receiver 10 on the belt 15, the case 11 is inverted by rotating it 180° about the axis of the stud 45, bringing the male member 40 to the orientation illustrated in FIGS. 5 and 6, with the button 50 oriented in the same direction as the opening 35.

The button 50 is aligned in front of the opening 35 and inserted thereinto in the direction of the arrow in FIG. 6, i.e., in a direction parallel to the axis of the stud 45. The button 50 is inserted until the front surface 42 of the male member 40 abuts the front surface 32 of the female member 30, in which position the button 50 will be disposed in the recess 38 and spaced a very slight distance from the bearing surface 39. Then, the case 11 is again rotated 180° to bring the male member 40 to an attached position, illustrated in FIG. 2, bringing the button 50 to the position illustrated in phantom in FIG. 3. This rotation is accommodated by the arcuate channels 53 and 54 which permit passage therethrough of the portion of the base plate 31 between the front surface 32 and the bearing surface 39.

Referring to FIG. 3, it can be seen that when the male member 40 is disposed in its attached position, the button 50 overlaps the bearing surface 39 at three locations. More specifically, the triangular portion 52 of the button 50 overlaps the bearing surface 39 at a region 55 at the bottom of the recess 38, while the part-circular portion 51 of the button 50 overlaps the bearing surface 39 at two laterally spaced-apart regions 56 and 57 toward the upper end of the recess 38. Preferably, the parts are dimensioned so that the area of the overlapped region 55 is approximately equal to the combined areas of the overlap regions 56 and 57, and the areas of the overlap regions 56 and 57 are substantially equal to each other.

It is an important feature of the invention that the areas of each of the overlap regions 56 and 57 is substantial, so that the forces exerted thereat by the tendency of the top of the case 11 to tip away from the belt 15 will be spread over a substantial area to minimize wear. It is also important that the button 50 engages the bearing surface 39 at all rotational positions of the male member 40 except the inserting position illustrated in FIG. 6. Thus, the male member 40 cannot accidentally become detached from the female member 30 until it has been rotated a full 180° from the attached position of FIG. 2.

Another significant aspect of the invention is that the parts are so dimensioned and arranged as to substantially prevent non-rotational movement of the male member 40 from its attached position. More particularly, the arcuate slots or channels 53 and 54 have a thickness only very slightly greater than the distance between the front and bearing surfaces 32 and 39, so as to trap the female member 30 and effectively prevent movement of the male member 40 axially of the stud 45. Also, when the male member 40 is disposed in its attached position, the arcuate surface 47 engages the cylindrical peripheral wall 35a at the bottom of the part-circular portion 36, while the arcuate surface 47 engages the peripheral wall 35a at laterally spaced apart points on the opposite sides of the triangular portion 37, thereby effectively preventing a translational movement of the male member 40 in directions parallel to the base plates 31 and 41. Indeed, the arrangement of the parts is such that when the button 50 is disposed in the recess 38, translational movement of the male member 40 in directions parallel to the base plates 31 and 41 is substantially prevented, regardless of the rotational position of the male member 40.

When it is desired to disengage the radio paging receiver 10 from the belt 15, the case 11 is again rotated 180° from the attached position of FIG. 2, and the male member 40 is withdrawn from the opening 35 in a direction opposite the arrow in FIG. 6.

From the foregoing, it can be seen that there has been provided an improved connecting apparatus which is of simple and economical construction, which provides a quick disconnect coupling of male and female members by simple insertion and rotation movements, which permits only relative rotational movement of the parts after insertion, which has improved wear characteristics, which minimizes the chance of accidental disconnection of the parts.

I claim:

1. Quick-release connecting apparatus for detachably interconnecting two objects, such as a belt and a device to be carried on the belt, including in combination: a female member adapted to be secured to one of the objects and having a front surface, said female member having a generally teardrop-shaped opening in the front surface thereof and a recess formed behind said opening, said opening having a part-circular portion and a lobe portion projecting from said part-circular portion and having an axis which bisects the arc of said part-circular portion, said recess being larger than said opening and communicating with the entire area of said opening and defining a bearing surface along the periphery of said opening, a male member adapted to be secured to the other object and having a stud extending therefrom and a button at the distal end of said stud, said button having the same configuration as said opening and being sized to pass therethrough but having a cross-sectional area substantially greater than that of said stud so that said button forms a flange extending laterally from said stud, said male member being rotatable about the axis of said stud between first and second positions when said stud is disposed in said opening with said button disposed in said recess, said button being aligned with said opening when said male member is in the first position thereof for permitting insertion of said button into and withdrawal of said button from said opening, said button being out of alignment with said opening and engageable with said bearing surface when said male member is in the second position thereof for preventing detachment of said male body from said female body.

2. The connecting apparatus of claim 1, wherein each of said female and male members is of unitary onepiece construction.

3. The connecting apparatus of claim 2, wherein each of said female and male members is formed of plastic.

4. The connecting apparatus of claim 1, wherein said recess is circular in shape.

5. The connecting apparatus of claim 4, wherein said lobe portion is generally in the shape of an isosceles triangle such that the arc of the part-circular portion and the angle between the equal-length sides of the isosceles triangular portion are bisected by a common line.

6. The connecting apparatus of claim 5, wherein said stud has two arcuate side surfaces on opposite sides thereof.

7. The connecting apparatus of claim 6, wherein said female member has a cylindrical surface defining said opening, said arcuate side surfaces being disposed for engagement with three spaced-apart portions of the cylindrical surface of said opening when said male member is disposed in said recess for substantially inhibiting translational movement of said male member in directions perpendicular to the axis of said stud.

8. The connecting apparatus of claim 1, wherein said opening extends completely through said female member.

9. The connecting apparatus of claim 8, wherein said female member has a rear surface, said recess being formed in said rear surface.

10. The connecting apparatus of claim 9, wherein said female member is substantially in the shape of a plate wherein said front and rear surfaces are substantially parallel planar surfaces.

11. The connecting apparatus of claim 10, wherein said male member includes a plate-like portion having a substantially planar front surface, said stud projecting from said front surface of said male member substantially perpendicular thereto, said front surfaces of said male and female members being disposed in abutting relationship when said button is disposed in said recess.

12. The connecting apparatus of claim 11, wherein said button has a planar rear surface disposed substantially parallel to said front surface of said male member and spaced therefrom a distance slightly greater than the distance between said front surface and said bearing surface of said female member, said front surface of said male member and said rear surface of said button being respectively engageable with said front surface and said bearing surface of said female member when said male member is disposed in its second position for substantially preventing movement of said male member in directions parallel to the axis of said stud.

13. The connecting apparatus of claim 1, wherein said male member rotates substantially 180° between said first and second positions thereof.

14. The connecting apparatus of claim 1, wherein said button engages said bearing surface at three spaced-apart locations when said male member is disposed in the second position thereof.

15. The connecting apparatus of claim 14, wherein one of said engagement locations is disposed at the bottom of said opening and the other engagement locations are disposed adjacent to the top of said opening, the area of said bottom engagement location being approximately equal to the combined areas of said top engagement locations.

16. The connecting apparatus of claim 1, wherein said button is inserted into and withdrawn from said opening in directions axially of said stud when said male member is in the first position thereof.

17. The connecting apparatus of claim 1, wherein when said button is disposed in said recess, said stud engages the perimeter of said opening at plural points thereon in all rotational positions of said male member for effectively preventing translational movement of said male member in directions perpendicular to the axis of said stud.

* * * * *